United States Patent Office

2,950,183
Patented Aug. 23, 1960

2,950,183

NUTRIENT SPRAY COMPOSITION FOR PLANTS

Alexander A. Nikitin, College Park, Charles C. Fite, Jr., East Point, and Janet Segers Gary, Union City, Ga., assignors to Tennessee Corporation, New York, N.Y., a corporation of New York No Drawing. Filed Mar. 24, 1958, Ser. No. 723,116

12 Claims. (Cl. 71—11)

This invention relates to nutrient spray, such as liquid fertilizers and trace element solutions, for application to growing plants.

It is well known that various so-called trace elements are necessary for healthy plant growth, in addition to the usual nitrogen, phosphorus, and potassium fertilizer materials. Lack of adequate supplies of these trace elements in the soil is sometimes a matter of local soil composition, but more often is due to depletion resulting from such causes as excessive liming, leaching by excessive rainfall, immobilization of trace elements as the result of low moisture, intensive cropping, etc. Chlorotic conditions resulting from such deficiencies are a common occurrence during the growing season unless the deficiencies are corrected, preferably by the use of sprays containing the desired trace element or elements since foliar treatment is both convenient and most effective. Usually the trace elements are provided in the form of sulfates, but other water soluble salts can be used instead such as chlorides, nitrates and acetates.

Obviously the trace element or elements required, as well as the amount to be supplied, may vary from one soil type to another and also with different crops. Among the trace elements that need to be supplied for healthy plant growth may be mentioned iron, manganese, zinc, copper, boron, molybdenum, etc. Iron, manganese, zinc and copper are commonly regarded as the essential nutrient trace elements and requirements for them have been definitely established for most soil types. Boron and molybdenum can be safely used only in extremely small concentrations governed by the character of the soil, such as heavy clay, sandy loam, muck soil, etc., and by the type of crop.

It is highly desirable in the interest of saving time, labor, and expense to make each spray application serve as many purposes as possible. Thus not only the trace element or elements but also nitrogen, phosphorus and/or potassium fertilizer materials are desirably incorporated in the spray liquid, and sometimes also one or more pesticides, provided of course that the several materials are all compatible with one another. For example, soluble potassium salts such as potassium chloride can be added to the spray solution as a source of potassium along with suitable trace element compounds. But diammonium phosphate, which is widely used in liquid fertilizer sprays as a source of both nitrogen and phosphorus, is incompatible with certain of the trace elements and also with certain pesticides and cannot be mixed directly with them in the same spray. The same incompatibility exists in sprays to which phosphoric acid and ammonia have been added, these materials being precursors of monoammonium and diammonium phosphate. For convenience, these materials are referred to generically as "ammonium phosphates" and the sprays as "ammonium phosphate solutions."

The chief object of the present invention is to provide an effective and suitable solution of the problems of compatibility between ammonium phosphate solutions and the trace elements iron, manganese and/or copper, so that these trace elements can be added to the solution to form a single spray.

It is important in sprays for foliar treatment that the above trace elements be in divalent form (monovalent in the case of copper). In the first place, plants absorb, translocate, and assimilate the trace elements much more readily in this form than in their oxidized states of higher valency. In the second place, oxidation of the trace element ions to states of higher valency results in precipitation of solid materials which interfere with the operation of the spray equipment, form undesirable spray residues and cause scale infestation on fruits, etc. No difficulty arises with zinc from the standpoint of oxidation, because zinc remains in the divalent form and has no effect on any other trace elements which may be present. But there is a strong tendency for ferrous, manganous and cuprous ions to oxidize to higher states of valency in ammonium phosphate solutions with the objectionable results already stated.

Moreover, although the manganous ion, $Mn^{++}$, is commonly much more stable than the ferrous ion, $Fe^{++}$, once manganese becomes oxidized it then exerts a powerful oxidizing action on iron. Thus it is known that ferrous ion, $Fe^{++}$, is much more readily oxidized in the presence of manganese than when iron is used alone. In view of these facts, the established practice has been to use iron and manganese at the very high ratio of 3–10 parts by weight of ferrous sulphate to one part manganous sulphate, depending upon the crops and soils treated. This high ratio of iron to manganese has been required to compensate for the iron which was lost due to oxidation by manganese and precipitation as ferric oxide ($Fe_2O_3$), which is inert and has no nutritional value. In addition, the inert ferric oxide builds up a heavy residue which interferes with the spray application by plugging the spray nozzles. Ferric oxide also causes high scale infestation on citrus fruits which greatly depreciates their value. Still further, iron is usually supplied in the form of ferrous sulphate ($FeSO_4$), and in this case its oxidation from ferrous to ferric results in the liberation of excess sulphate ion which is injurious to foliage.

The aforesaid incompatibility of divalent iron and manganese and monovalent copper with ammonium phosphate solutions results from the high alkalinity of these solutions which causes oxidation and resulting precipitation of trace elements. This alkalinity is also detrimental to many organic pesticides, causing their decomposition. Of course, the alkalinity can be reduced by adding an acid which is suitable for use in a plant spray, such as phosphoric acid, but the trace elements are not stabilized against the oxidation which would take place as the result of high alkalinity of diammonium phosphate solutions, unless the pH of these solutions is so low (e.g., 4.1–4.7 or even less; see Table II) as to be very injurious to plant foliage. In fact, while some ornamental plants such as laurel can tolerate a solution having a pH range as low as 5.5–6.1, for most plants the pH value should preferably be between 6.1 and 7.0.

The present invention is based on the discovery that the trace elements iron, manganese, zinc and copper are rendered compatible with ammonium phosphate solutions, and three of these trace elements—iron, manganese and copper—are retained in the state of lower valency, either alone or in combination, by the addition to such solutions of appropriate amounts of oxalic acid or soluble oxalates, while at the same time the pH values of the solutions can be obtained in as high a range as pH 6.1–7.0, a range which is entirely safe for application to plant foliage. The results obtained with oxalic and phosphoric acids are set forth for comparison in the following Tables I and II:

TABLE I

*The effect of oxalic acid on the availability of trace elements (Fe, Mn, and Zn: retained in divalent form) in diammonium phosphate solution, at various pH values*

| 75% Oxalic Acid (gm.) | pH | Percent Availability | | | Materials Used |
|---|---|---|---|---|---|
| | | Fe | Mn | Zn | |
| ---------- | 8.0 | 9.1 | 6.67 | 5.9 | $FeSO_4.7H_2O$ (22% Fe) at 5 g./liter. |
| 6 ---------- | 7.2 | 18.2 | 6.67 | 5.9 | $MnSO_4.2H_2O$ (30% Mn) at 5 g./liter. |
| 12 ---------- | 6.8 | 36.4 | 6.67 | 5.9 | $ZnSO_4.H_2O$ (34% Zn) at 5 g./liter. |
| 18 ---------- | 6.5 | 86.0 | 6.67 | 11.8 | $(NH_4)_2HPO_4$ (21% N; 53% $P_2O_5$) at 100 g./liter. |
| 24 ---------- | 6.2 | 100 | 6.67 | 23.5 | 75% Oxalic Acid, $H_2C_2O_4.2H_2O$, Various quantities, as shown in Table I. |
| 28 ---------- | 6.1 | 100 | 33.3 | 70.6 | |
| 34 ---------- | 5.8 | 100 | 64.0 | 94.1 | |

TABLE II

*The effect of phosphoric acid on the availability of trace elements (Fe, Mn, and Zn: retained in divalent form) in diammonium phosphate solutions at various pH values*

| 85% Phosphoric Acid (gm.) | pH | Percent Availability | | | Materials Used |
|---|---|---|---|---|---|
| | | Fe | Mn | Zn | |
| ---------- | 8.0 | 9.1 | 6.67 | 5.9 | $FeSO_4.7H_2O$ (22% Fe) at 5 g./liter. |
| 58.5 ---------- | 5.6 | 9.1 | 6.67 | 5.9 | $MnSO_4.2H_2O$ (30% Mn) at 5 g./liter. |
| 64.7 ---------- | 5.2 | 9.1 | 13.3 | 11.8 | $ZnSO_4.H_2O$ (34% Zn) at 5 g./liter. |
| 72.9 ---------- | 4.8 | 9.1 | 66.7 | 11.8 | $(NH_4)_2HPO_4$ (21%N; 53%$P_2O_5$) at 100 g./liter. |
| 81.0 ---------- | 4.4 | 9.1 | 100 | 47.1 | 85% Phosphoric Acid, $H_3PO_4$ various quantities, as shown in Table II. |
| 85.0 ---------- | 4.0 | 15.0 | ------ | 81.0 | |
| 89.0 ---------- | 3.4 | 100 | ------ | 100 | |

The amount of oxalic acid or oxalate to be used depends upon the particular pH value within the range of 6.1–7.0 which is desired in the final spray solution. The following values are illustrative:

TABLE III

*The effect of oxalic acid on pH of final solution (from standpoint of quantitative relationship between oxalic acid and diammonium phosphate)*

| Ratio, diammonium phosphate (gm)/oxalic acid (gm) | pH of final solution containing diammonium phosphate, oxalic acid, and trace elements |
|---|---|
| 100:8 | 7.00 |
| 100:10 | 6.90 |
| 100:12 | 6.80 |
| 100:14 | 6.70 |
| 100:16 | 6.65 |
| 100:18 | 6.50 |
| 100:20 | 6.40 |
| 100:22 | 6.35 |
| 100:24 | 6.20 |
| 100:26 | 6.15 |
| 100:28 | 6.10 |

(In all cases, diammonium phosphate was used at 100 g./l. and trace elements were used at the concentrations shown in Tables I and II.)

As shown in Tables I and III the amount of oxalic acid to be used can be defined not only in terms of the pH of the resulting composition but also as a ratio of diammonium phosphate to oxalic acid. In all cases, the character of reaction of the final solution was held within the limits of pH 6.1–7.0. The upper or lower limit of pH value, or some intermediate value, may be utilized most effectively for determining the correct proportions of materials to be used in preparing the desired spray solution depending upon the particular trace elements used. For instance, Table I shows that iron retains its chemical stability in divalent form even at the higher pH values shown in Table III, whereas for manganese it may be necessary to reduce the pH to the lower value shown in Table III (pH 6.1). Thus the pH to which the final spray is to be adjusted will depend upon the trace elements that may be used, and the amount of oxalic acid to be used may be determined accordingly as shown by Table III. For example, if a pH of 6.5 is desired, a sufficient amount of oxalic acid should be used to provide the ratio 100:18.

Oxalic acid, when used to obtain the range of pH of the final spray solution containing trace elements and diammonium phosphate as shown in Tables I and III, i.e., pH 6.1–7.0, makes iron, manganese, copper and zinc compatible individually or together with ammonium phosphate spray solutions. That is, oxalic acid renders the trace elements available as plant nutrients. Oxalic acid thus protects iron, manganese and copper against oxidation even in the comparatively high pH range, 6.1–7.0.

The results given in Table III show that when the ratio of diammonium phosphate to oxalic acid is high (i.e., 100:8 to 100:16), the alkalinity of the resulting mixture is comparatively high (i.e., pH 6.65–7.00), and under these conditions it is most advantageous to use ammonium oxalate. Upon further reduction of the ratio of diammonium phosphate to oxalic acid (i.e., 100:18 to 100:28), the alkalinity of the resulting solution is also reduced to the lower range (i.e., pH 6.10–6.50), and oxalic acid should be employed. In each case, the guide for the selection of the form of oxalate to be used depends principally upon the pH desired in the final spray.

Any of the other soluble oxalates, such as potassium and sodium oxalates, may also be employed, as well as ammonium oxalate and oxalic acid. However, the most economical form is oxalic acid from the standpoint of the cost, on the basis of the higher percentage of oxalate radical.

As already stated, requirements for iron, manganese, zinc, and copper have been definitely established for most soil types and crops, and with oxidation losses negligible, the amount of these trace elements needed in the spray can be determined directly from these established requirements. In most cases, a much larger amount of diammonium phosphate is employed as compared with the trace elements used, and its ratio to total trace elements (including boron and molybdenum) is typically in the neighborhood of 100:5. Wide variations in known requirements for trace elements are encountered with different crops and particular trace elements. For example, cotton commonly requires from 25 to 50 lbs. of manganous sulphate per acre, whereas oats may require, in some cases, up to 100 lbs. per acre.

Table II shows that when phosphoric acid is used, iron is much less readily available than manganese in diammonium phosphate solutions. That is, the pH must be reduced to consideraby lower values than in the case of manganese before iron becomes available in comparatively large concentrations. When oxalic acid is used, however, Table I shows that iron becomes more readily available in its divalent form than manganese in the pH range of this invention (6.1–7.0). A comparison of Tables I and II shows that both iron and manganese are rendered more readily available with oxalic acid than with phosphoric acid, in the pH range of the invention (6.1–7.0), and there is an even greater increase in the availability of iron as compared with manganese. This greater increase of available iron as a result of the protective action of oxalic acid against oxidation of iron by manganese and by high alkalinity makes possible the use of iron and manganese in the same solution at the reduced ratio of 1–2 parts by weight of ferrous sulphate to 1 part manganous sulphate, instead of the ratio formerly necessary, i.e., 3–10 parts ferrous sulphate to 1 part manganous sulphate. This lower ratio of iron to manganese results in a great reduction in the amount of inert ferric oxide ($Fe_2O_3$) formed in the spray solution. This reduction makes it possible to secure much cleaner fruit by eliminating the excessive spray residue; and this, in turn, reduces the scale infestation on fruits.

Another improvement resulting from this lower ratio between iron and manganese is a reduction in the concentration of sulphate ion derived from ferrous sulphate ($FeSO_4$). The reduction in the concentration of sulphate ion is particularly important since it prevents the severe injury to foliage which results from an excessive concentration of sulphate ion.

There is no interference between zinc and any of the other trace elements, since zinc remains stable in its divalent form, and has no oxidizing effect on iron, manganese and copper. Therefore, there are no requirements for any particular ratio between zinc and any of the other trace elements and the amount of zinc salt to be used depends entirely on the extent of deficiency of the soils on which the crops are being produced.

Representative examples of actual spray compositions containing both major (nitrogen and phosphorus) and trace elements (as sulphates: $FeSO_4$, $ZnSO_4$, $MnSO_4$, and $Cu_2SO_4$) are as follows:

20–50 gm. all four trace elements (as sulphates: $FeSO_4 \cdot 7H_2O$; $MnSO_4 \cdot 2H_2O$; $ZnSO_4 \cdot H_2O$; $Cu_2SO_4$), using 5–10 gm. of the salt of each element; or 20–50 gm. of any one or more of these elements (as sulphate) as desired.
40–80 gm. oxalate (expressed as technical oxalic acid, $H_2C_2O_4 \cdot 2H_2O$).
200–600 gm. diammonium phosphate $(NH_4)_2HPO_4$.
10,000 ml. tap water.
(In the above formulations, all materials are of technical grade.)

The materials of the above representative compositions can be used in the form of a uniform mixture of dry crystals. In the preparation of a suitable spray, this crystalline mixture is dissolved in ordinary tap water with steady agitation. A mixture of the above proportions and amounts will usually be dissolved in about 10,000 ml. of water. When the dissolving action is complete and a constant pH is reached, the solution is ready for use as a spray.

When phosphoric acid and ammonia are used, gaseous ammonia is conducted from a cylinder or like source into a solution containing an amount and concentration of phosphoric acid equivalent to the 200–600 gm. diammonium phosphate per 10,000 ml. water mentioned above. To the resulting ammonium phosphate solution, 40–80 gm. oxalic acid and 20–50 gm. trace element sulphates are added and subjected to steady agitation until dissolved and a constant pH is reached.

Still another advantage of the invention is that the liquid spray, containing the nutrient elements, is rendered compatible with commonly used fungicidal and insecticidal materials. Nitrogen and phosphorus, when used in the form of diammonium phosphte, are not compatible with fungicides due to the high alkalinity of diammonium phosphate, which decomposes the pesticides. It has already been shown above that when phosphoric acid is used to stabilize the trace elements in diammonium phosphate solutions, the pH is necessarily reduced so low in obtaining this stability that the resulting solution is injurious to foliage. However, when oxalic acid is substituted for the phosphoric acid, the trace elements retain their lower valency in the higher pH range of 6.1–7.0 where the spray is safe for foliar treatment as already pointed out, and where the objectionable effects of alkalinity on pesticides are also eliminated.

It will be understood that the invention is not restricted to the foregoing details of description or examples, and that reference should be had to the appended claims for a definition of its limits.

What is claimed is:

1. A nutrient spray for application to growing plants comprising an aqueous solution of ammonium phosphate and oxalic acid in the proportions of from 8 to 28 parts by weight of oxalic acid to 100 parts by weight of diammonium phosphate and said solution having a pH in the range of 6.1 to 7.0, said solution also containing as trace metal supplements soluble metal salts selected from the group consisting of ferrous, manganous, cuprous and zinc sulfates, chlorides and nitrates and mixtures thereof, the total amount of said supplements not substantially exceeding the proportion of 50 gm. of supplements to 200 gm. of diammonium phosphate and said solution containing a minimum of 0.1 gm. per liter of available trace metal for each trace metal salt contained therein.

2. A nutrient spray as defined in claim 1, said trace metal supplement comprising ferrous sulfate.

3. A nutrient spray as defined in claim 1, said trace metal supplement comprising manganous sulfate.

4. A nutrient spray as defined in claim 1, said trace metal supplement comprising cuprous sulfate.

5. A nutrient spray as defined in claim 1, said trace metal supplement comprising zinc sulfate.

6. A nutrient dry crystalline composition to be dissolved in water for spray application to growing plants comprising a dry mixture of water soluble ammonium phosphate, oxalic acid, and water soluble trace element supplements selected from the group consisting of ferrous, manganous, cuprous, and zinc sulfates, chloride, and nitrates and mixtures thereof, said ammonium phosphate and oxalic acid being in the proportions of from 8 to 28 parts by weight of oxalic acid to 100 parts by weight of diammonium phosphate, said diammonium phosphate being dissolved in the range of 200–600 gm. in 10,000 ml. of water providing a solution pH in the range of 6.1–7.0, the amount of said supplements being in the proportion of about 3.3 to 25 parts by weight of supplements to 100 parts by weight of diammonium phosphate.

7. A nutrient spray composition as defined in claim 6, said trace element supplement comprising ferrous sulfate.

8. A nutrient spray composition as defined in claim 6, said trace element supplement comprising manganous sulfate.

9. A nutrient spray composition as defined in claim 6, said trace element supplement comprising ferrous and manganous sulfates in the proportions of 1–2 parts by weight of ferrous sulfate to 1 part manganous sulfate.

10. A nutrient spray composition as defined in claim 6, said trace element supplement comprising cuprous sulfate.

11. A nutrient spray composition as defined in claim 6, said trace element supplement comprising zinc sulfate.

12. A nutrient dry crystalline composition to be dissolved in water for spray application to growing plants comprising a dry mixture of the following ingredients in the following proportions: 200–600 gm. diammonium phosphate, 40–80 gm. oxalic acid, and 20–50 gm. trace element compounds selected from the group consisting of ferrous sulfate ($FeSO_4 \cdot 7H_2O$), manganous sulfate ($MnSO_4 \cdot 2H_2O$), zinc sulfate ($ZnSO_4 \cdot H_2O$), cuprous sulfate ($Cu_2SO_4$), and mixtures thereof, said dry mixture being dissolved in 10,000 ml. of water providing a solution pH in the range of 6.1–7.0.

References Cited in the file of this patent

UNITED STATES PATENTS

| | | |
|---|---|---|
| 2,587,125 | Ellingson | Feb. 26, 1952 |
| 2,770,540 | Vierling | Nov. 13, 1956 |
| 2,772,151 | Nikitin | Nov. 27, 1956 |